US011922760B2

(12) United States Patent
Marks

(10) Patent No.: US 11,922,760 B2
(45) **Date of Patent: *Mar. 5, 2024**

(54) SYSTEMS AND METHODS OF ELECTRONIC GAMING INCLUDING A PLAYER GOAL WHEEL ARRANGED TO DISPLAY A PLURALITY OF PLAYER GOALS

(71) Applicant: Aristocrat Technologies Australia Pty Limited, North Ryde (AU)

(72) Inventor: Daniel Mordecai Marks, Decatur, GA (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,568

(22) Filed: May 16, 2022

(65) Prior Publication Data

US 2022/0277614 A1 Sep. 1, 2022

Related U.S. Application Data

(63) Continuation of application No. 16/983,837, filed on Aug. 3, 2020, now Pat. No. 11,335,157, which is a (Continued)

(51) Int. Cl.
*A63F 9/24* (2006.01)
*A63F 11/00* (2006.01)
(Continued)

(52) U.S. Cl.
CPC ...... *G07F 17/3213* (2013.01); *G07F 17/3276* (2013.01); *G07F 17/34* (2013.01)

(58) Field of Classification Search
CPC ... G07F 17/32; G07F 17/3211; G07F 17/3214
(Continued)

(56) References Cited

U.S. PATENT DOCUMENTS 7,399,226 B2 7/2008 Mishra
7,819,741 B1 10/2010 Luciano
(Continued)

OTHER PUBLICATIONS

Notice of Allowance dated Apr. 8, 2020, for U.S. Appl. No. 16/141,547 (pp. 1-9).
(Continued)

*Primary Examiner* — Adetokunbo O Torimiro
(74) *Attorney, Agent, or Firm* — Armstrong Teasdale LLP

(57) ABSTRACT

An electronic gaming machine may present a wagering game in which a player goal is displayed for a player of the electronic gaming machine. In general, the player goal may specify a goal to be achieved by the player in an associated reel game. In one embodiment, such a player goal is displayed on a simulated wheel (or "goal wheel"). During play of the wagering game, the electronic gaming machine may spin and stop the goal wheel to identify one of the player goals displayed on the goal wheel. Likewise, the electronic gaming machine may spin and stop a plurality of reels to display a game outcome. The electronic gaming machine may compare the identified player goal to the game outcome, and if the game outcome matches or otherwise satisfies the player goal, the electronic gaming machine may provide a game award (and/or another game feature, such as a bonus game) to the player.

20 Claims, 6 Drawing Sheets

Related U.S. Application Data continuation of application No. 16/141,547, filed on Sep. 25, 2018, now Pat. No. 10,741,011.

(51) Int. Cl.

| | |
|---|---|
| ***G06F 13/00*** | (2006.01) |
| ***G06F 17/00*** | (2019.01) |
| ***G07F 17/32*** | (2006.01) |
| ***G07F 17/34*** | (2006.01) |

(58) Field of Classification Search

USPC .............................. 463/1, 20, 22, 25, 29, 30

See application file for complete search history.

(56) References Cited

U.S. PATENT DOCUMENTS

| | | | |
|---|---|---|---|
| 2003/0060277 | A1 | 3/2003 | Webb |
| 2003/0069066 | A1 | 4/2003 | Seelig |
| 2004/0121838 | A1 | 6/2004 | Hughs-Baird |
| 2005/0020343 | A1 | 1/2005 | Gerrard |
| 2006/0116191 | A1 | 6/2006 | Vancura |
| 2007/0010306 | A1 | 1/2007 | Kanno |
| 2008/0139288 | A1 | 6/2008 | Jackson |
| 2009/0117993 | A1 | 5/2009 | Bigelow, Jr. |
| 2009/0312087 | A1 | 12/2009 | Winegardner |
| 2012/0122571 | A1 | 5/2012 | Desimone |
| 2013/0225252 | A1 | 8/2013 | Yamauchi |
| 2014/0194180 | A1 | 7/2014 | Elmqvist |

OTHER PUBLICATIONS

Office Action (Non-Final Rejection) dated Oct. 27, 2021 for U.S. Appl. No. 16/983,837 (pp. 1-5).

Office Action (Notice of Allowance and Fees Due (PTOL-85)) dated Jan. 19, 2022 for U.S. Appl. No. 16/983,837 (pp. 1-5).

SYSTEMS AND METHODS OF ELECTRONIC GAMING INCLUDING A PLAYER GOAL WHEEL ARRANGED TO DISPLAY A PLURALITY OF PLAYER GOALS

CROSS REFERENCE TO RELATED APPLICATIONS

This application is a continuation of and claims priority to U.S. patent application Ser. No. 16/983,837, filed Aug. 3, 2020, which is a continuation of and claims priority to U.S. patent application Ser. No. 16/141,547, filed Sep. 25, 2018, all which are incorporated herein by reference in their entireties.

TECHNICAL FIELD

The field of disclosure relates generally to electronic gaming, and more particularly, to systems and methods of electronic gaming that include a player goal wheel that is displayed along with a plurality of reels, and wherein the player goal wheel indicates one or more player goals to be achieved using the plurality of reels.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

SUMMARY

An electronic gaming machine is provided. In at least some embodiments, the electronic gaming machine may be configured to present a wagering game in which a player goal is displayed for a player of the electronic gaming machine. In general, the player goal may specify a goal to be achieved by the player in an associated reel game, such as, for example, on a plurality of reels displayed in conjunction with the player goal. The player goal may be presented in a variety of formats. In one example, a simulated wheel (or "goal wheel") is provided. The goal wheel is divided into a plurality of sectors, and each sector is associated with a respective player goal.

During play of the wagering game, the electronic gaming machine may spin and stop the goal wheel to identify one of the player goals displayed on the goal wheel. Likewise, the electronic gaming machine may spin and stop a plurality of reels to display a plurality of symbols (or a "game outcome") from each reel of the plurality of reels. With each spin of the reels, the electronic gaming machine may compare the identified player goal to a respective game outcome, and if any game outcome matches or otherwise satisfies the player goal, the electronic gaming machine may provide a game award (and/or another game feature, such as a bonus game) to the player.

BRIEF DESCRIPTION OF THE DRAWINGS

An example embodiment of the subject matter disclosed will now be described with reference to the accompanying drawings.

DETAILED DESCRIPTION

The wagering game described herein may include one or more goal wheels and one or more sets of reels. In the exemplary embodiment, a single goal wheel is provided in conjunction with a single set of reels. The goal wheel may be partitioned into a plurality of sectors, each of which may specify a player goal to be achieved on the reels for a particular award. Specifically, the goal wheel may include a plurality of player goals, each of which may indicate a goal that a player may attempt to achieve on the reels. During gameplay, the goal wheel may be spun and stopped, such that a sector of the wheel, including a player goal, is selected and identified. Further, the reels may be spun and stopped, and a plurality of symbols from each of the reels may be displayed. The symbols from each reel may be evaluated to determine whether the player goal associated with the identified sector of the goal wheel is satisfied by the symbols displayed from the reels. If the player goal is satisfied, the player may receive a game award, a bonus game, such as a "frenzy" game, may be initiated, and/or any other suitable action may be taken.

Figure 1:
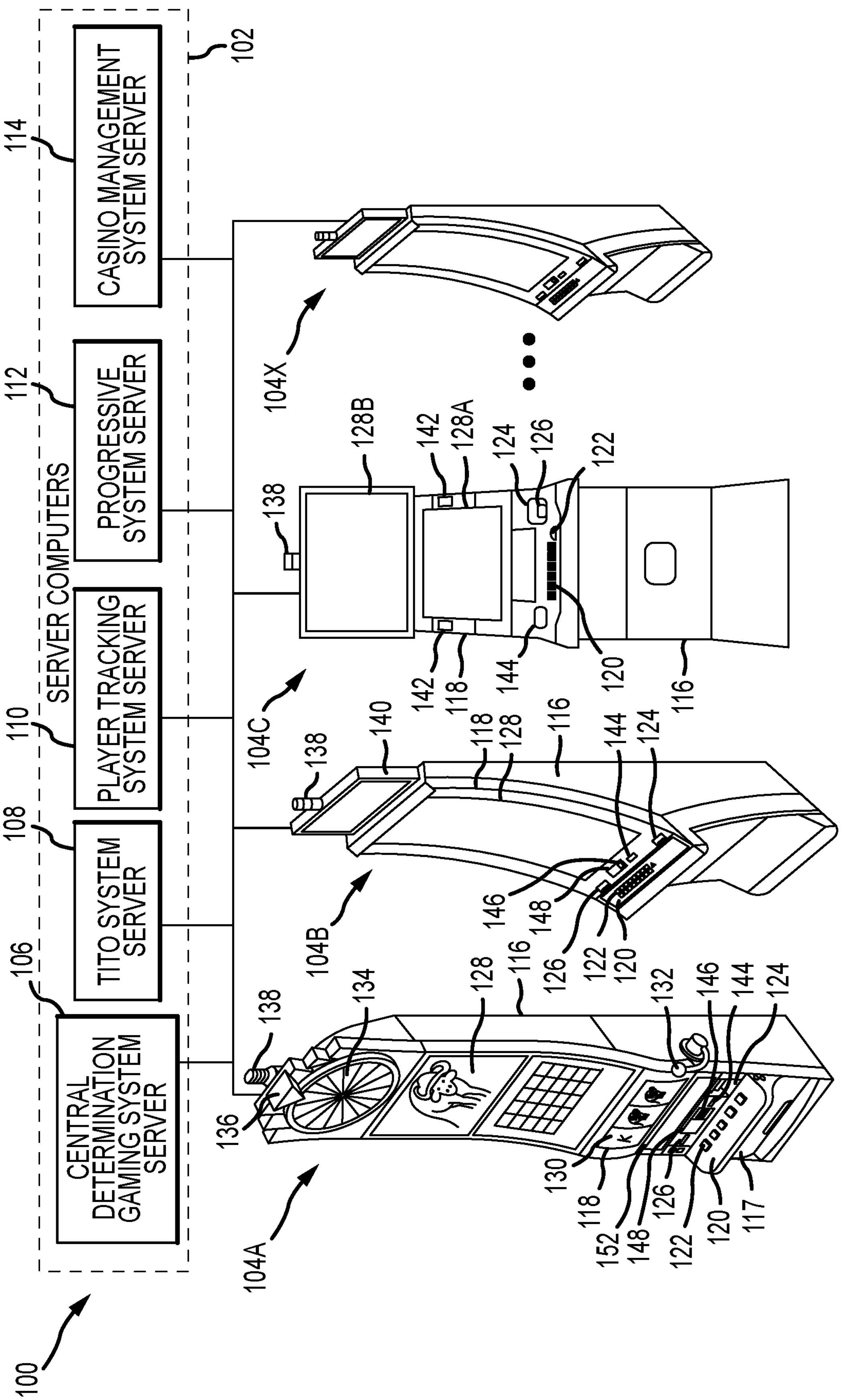
FIG. 1 is an exemplary diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
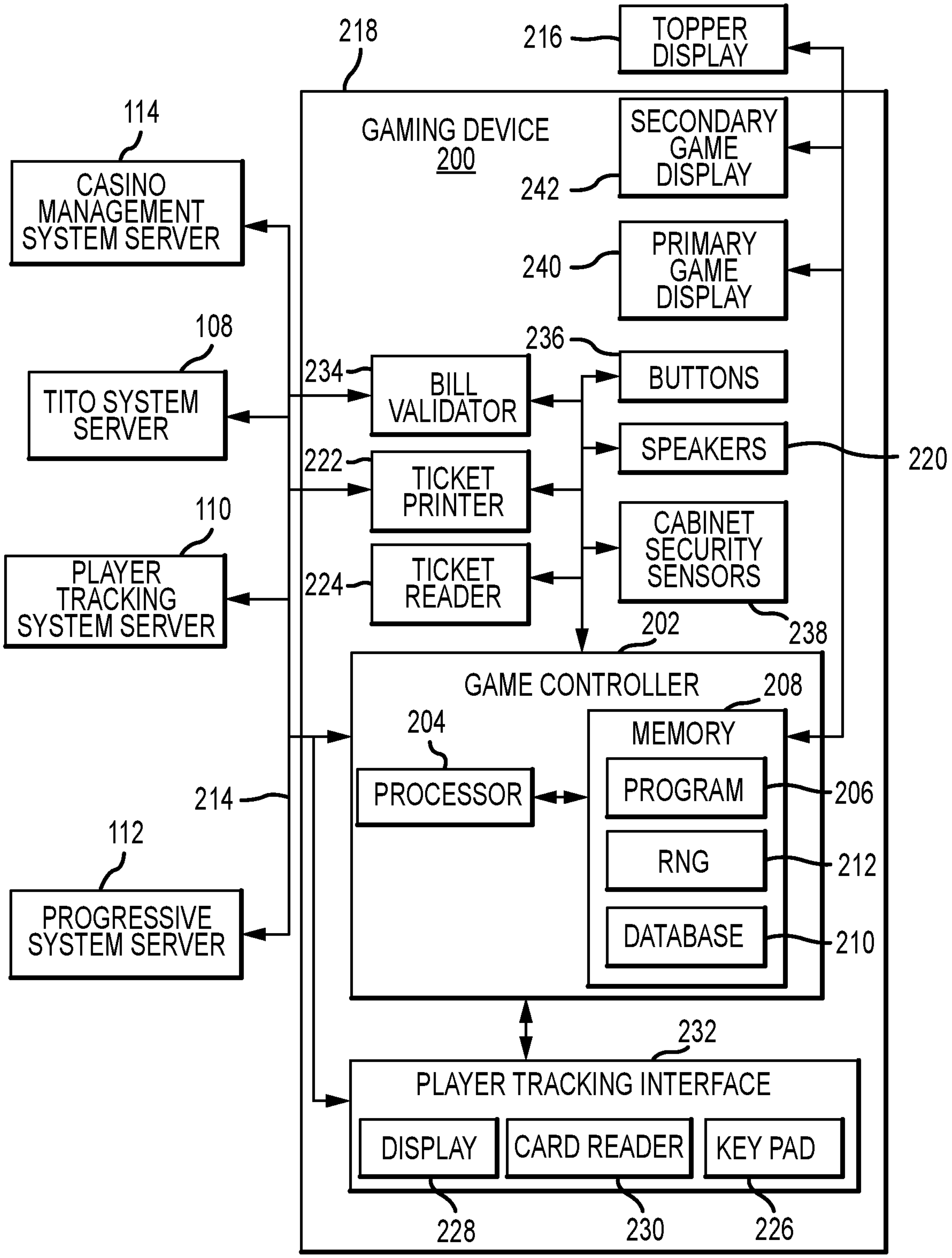
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc' model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide new technology in that they facilitate a wagering game in which a player goal is specified, and in which a game outcome achieved by or provided to a player is compared to the player goal to determine whether any of a variety of awards, such as, for example, game awards or feature games, may be provided to a player. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
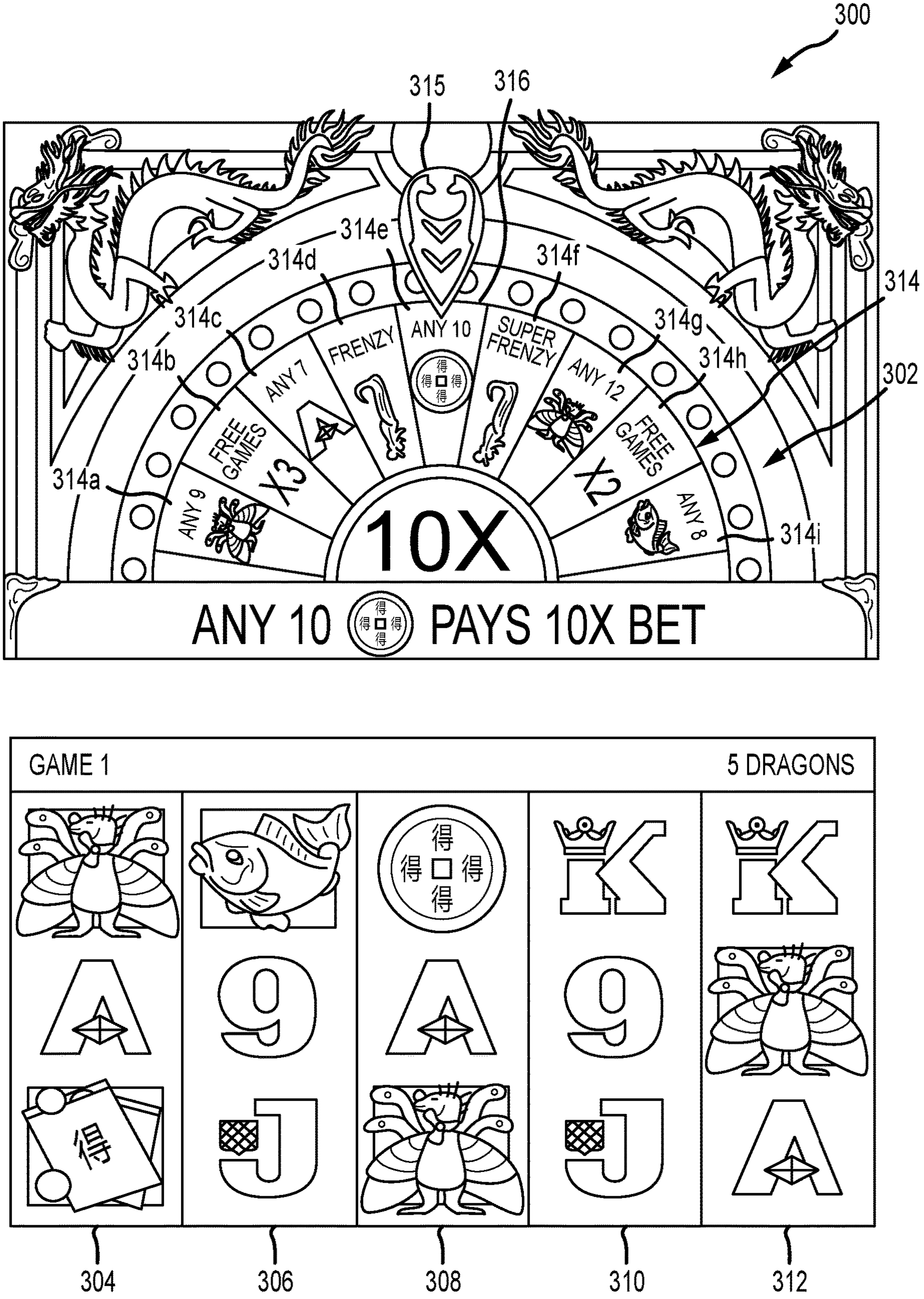
FIG. 3 is an illustration of a visual display of an exemplary wagering game that includes a goal wheel and a plurality of reels.

FIG. 3 is an illustration of a visual display of an exemplary wagering game 300. In the exemplary embodiment, wagering game 300 includes a goal wheel 302 and a plurality of reels, such as a first reel 304, a second reel 306, a third reel 308, a fourth reel 310, and a fifth reel 312. Reels 304-312 may include simulated or "virtual" reels generated and displayed by game controller 202 on primary game display 240 and/or secondary game display 242. In the exemplary embodiment, reels 304-312 are displayed on primary game display 240. In other embodiments, reels 304-312 may include one or more physical or mechanical reels having a display element, such as a liquid crystal display (LCD), capable of displaying one or more symbols during gameplay. In other embodiments, reels 304-312 may include a plurality of mechanical reels overlaid by an LCD panel.

Each reel 304-312 may include a plurality of symbols, and symbols from each reel 304-312 may be displayed in one of a plurality of symbol positions, which may, together, define a matrix of symbol positions. Each symbol position may be designated by a row number (e.g., "1," "2," "3," etc.) and a column letter (e.g., "A," "B," "C," "D," "E," etc.) For example, the upper-left-most symbol position, occurring on reel 304 at the intersection of row 1 and column A, may be designated by the symbol position "1A."

Accordingly, during gameplay, one or more reels 304-312 may be spun virtually and stopped to display a subset of the symbols of one or more reels 304-312. In particular, in at least some embodiments, one or more reels 304-312 may be spun and stopped in response to credit wager placed by a player (e.g., which a player may place by selecting a "spin" button). In at least some embodiments, three symbol positions of one or more reels 304-312 may be selected, stopped, and displayed by game controller 202 for presentation to a player. In addition, in at least some embodiments, one or more consecutive symbols are selected for presentation. For example, if a symbol at symbol position "1A" is selected by game controller 202 for presentation, the symbols at symbol positions "2A" and "3A" may also be selected and displayed.

Goal wheel 302 may include a simulated or "virtual" wheel generated and displayed by game controller 202 on primary game display 240 and/or secondary game display 242. In the exemplary embodiment, goal wheel 302 is displayed on secondary game display 242. In other embodiments, goal wheel 302 may include a physical or mechanical wheel having a display element, such as a liquid crystal display (LCD), capable of displaying one or more player goals to be achieved during gameplay. In other embodiments, goal wheel 302 may be any other mechanical or physical wheel, such as a mechanical wheel overlaid by an LCD panel. Further, in at least some embodiments, a plurality of goal wheels may be displayed to provide a plurality of player goals achievable during a single spin (or multiple spins) of reels 304-312.

Goal wheel 302 may include a plurality of sectors 314. Specifically, goal wheel 302 may include a plurality of sectors 314, which may range from only a few very large sectors (e.g., sectors taking up a substantial area of goal wheel 302) to a larger number of smaller sectors (e.g., a larger number of sectors, each taking up a smaller area of goal wheel 302). In the exemplary embodiment, there are nine sectors shown, and these are labeled, from right to left, 314*a*, 314*b*, 314*c*, 314*d*, 314*e*, 314*f*, 314*g*, 314*h*, and 314*i*. Although nine sectors 314*a*-314*i* are shown, it will be appreciated that goal wheel 302 may be divided into any suitable number of sectors.

Each sector 314*a*-314*i* of the plurality of sectors 314 may be associated with, and display, an associated player goal to be achieved during gameplay for a particular award. As described herein, a player may attempt to achieve a player goal displayed on goal wheel 302. However, the player may not always achieve a specified player goal during a particular spin of reels 304-312. For instance, as described below, reels 304-312 may be evaluated to determine whether a player goal specified on goal wheel 302 is achieved. In some cases, one or more symbols displayed from reels 304-312 may correspond to or satisfy a goal specified on goal wheel 302, in which case, a game award and/or another in-game feature may be provided. However, a player may not always achieve a specified goal, in which case reels 304-312 may be re-spun and/or a new goal selected from goal wheel 302.

In some embodiments, a game award (or "prize") associated with a particular player goal may be selected and/or re-selected by game controller 202 at any time during gameplay, such as prior to or after any number of spins of reels 304-312. For example, in at least one embodiment, game controller 202 may select a game award, such as from a table or weighted table of game awards, prior to one or more spins of reels 304-312. The selected game award may be assigned to or associated with one or more player goals, which, as described herein, may be displayed on one or more sectors 314*a*-314*i* of goal wheel 302.

In addition, once a game award is assigned to a player goal, the game award may remain the same for any number of spins of reels 304-312. For example, the game award may remain the same, once it is assigned to a player goal, for a predetermined number of spins of reels 314-312, until the player terminates wagering game 300, and/or for any other suitable duration.

On the other hand, and in some embodiments, a game award may be changed by game controller 202, such as, for example, after a predefined number of spins of reels 304-312, in response to initiation of a new wagering game 300, when the player adds one or more credits to an existing credit balance, in response to a player request to update or reassign game awards, and the like. In one example embodiment, after a specified number of spins of reels 304-312, a game award associated with a particular player goal may increase or otherwise improve. For instance, if a game award associated with a particular player goal begins at "10× bet," the game award may increase by a multiplier, such as "1×," "2×," "3×," etc., for every predefined number of spins, such as for every one-hundred spins.

Further, in at least some embodiments, a game award may be updated or altered in response to the occurrence of one or more symbols, such as one or more "determining symbols," on reels 304-312. As used herein, a "determining symbol" may include any symbol which, when it occurs or is displayed on reels 304-312 after reels 304-312 have stopped, results in an adjustment or alteration of at least one game award. For example, each spin of reels 304-312 that results in the display of one or more determining symbols, such as one or more "+1×," "+2×," "+3×," etc., symbols, may cause one or more game awards to increase by an associated factor (e.g., double, triple, etc.)

Goal wheel 302 may also include a pointer 315, which may be used to identify, specify, or otherwise indicate a sector 314*a*-314*i* of goal wheel 302 selected, as described herein, during gameplay. For example, as described herein, goal wheel 302 may be spun and stopped, and once stopped, pointer 315 may point to a particular sector 314*a*-314*i* to indicate that the sector 314*a*-314*i* was selected by game controller 202. Accordingly, pointer 315 may specify a sector 314*a*-314*i* of goal wheel 302 to identify a goal to be achieved by a player.

In various embodiments, a player goal may correspond to any player goal that a player may achieve on reels 304-312. In other words, each player goal displayed on goal wheel 302 may correspond to a specified symbol combination and/or another specified outcome that may occur on reels 304-312. One example player goal may be to achieve or collect ten occurrences of a specified symbol, such as a coin symbol, on reels 304-312. It will be appreciated, however, that each sector 314*a*-314*i* of goal wheel 302 may be associated with a different player goal. In some embodiments, one or more sectors 314*a*-314*i* may also be associated with a same player goal. It will be further appreciated that any suitable player goal capable of presentation and/or occurrence on reels 304-312 may be assigned to a sector 314*a*-314*i* of goal wheel 302.

Figure 4:
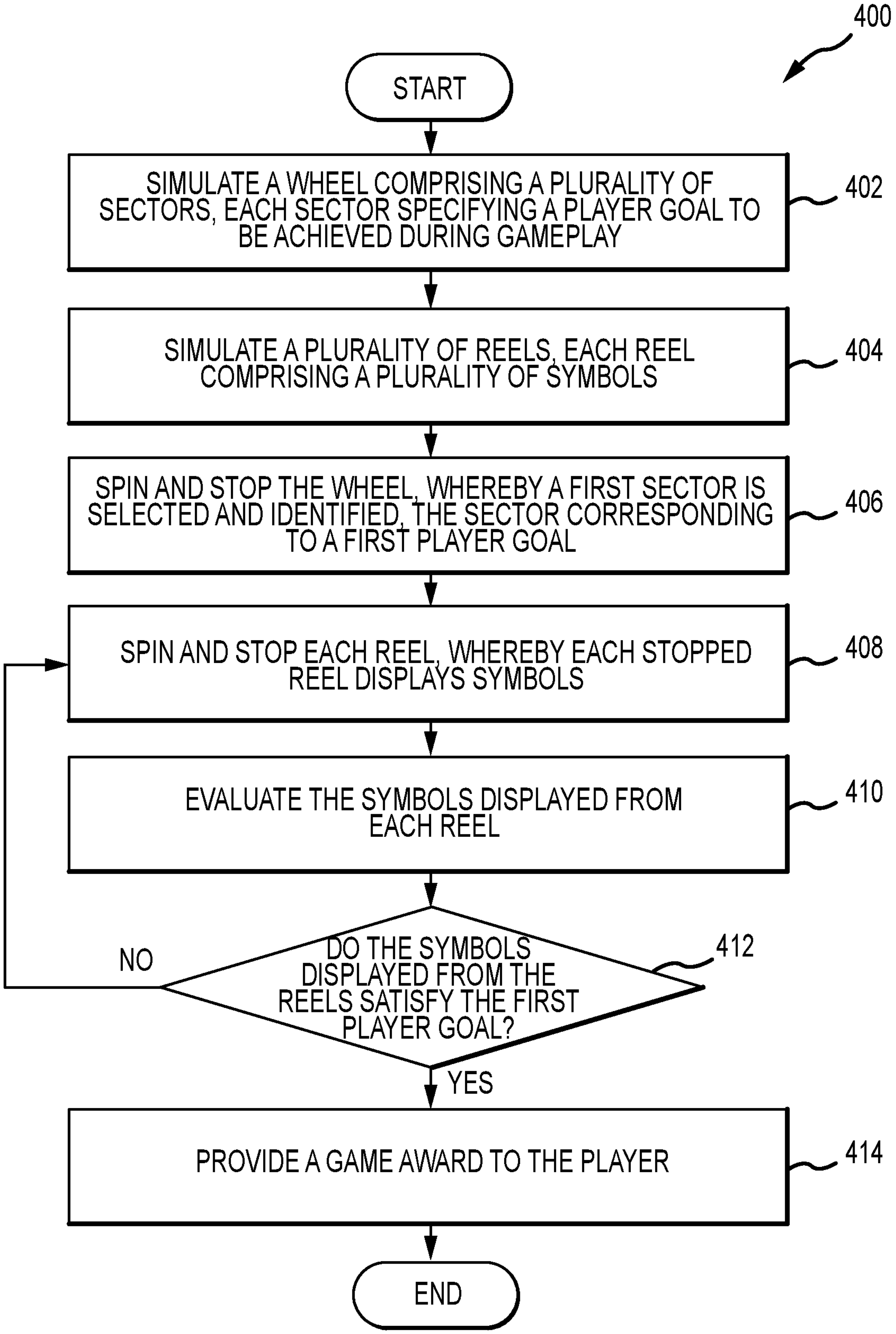
FIG. 4 is a flowchart illustrating an exemplary process for playing the wagering game including the goal wheel and plurality of reels shown at FIG. 3.

FIG. 4 is a flowchart illustrating an exemplary process 400 for playing wagering game 300 (shown at FIG. 3). In the exemplary embodiment, game controller 202 may simulate spinning and stopping a goal wheel 302 (or spin goal wheel 302, in the case that goal wheel 302 is mechanical) (step 402). As described herein, goal wheel 302 may include a plurality of sectors 314, such as sectors 314*a*-314*i*, each of which may correspond to a player goal to be achieved during wagering game 300. More particularly, each sector 314*a*-314*i* of goal wheel 302 may correspond to a player goal that a player may be able to achieve on reels 304-312. One example player goal may be for a player to collect a specified number of symbols (e.g., "coin" symbols). It will be appreciated that each player goal may correspond to any combination of symbols and/or any other feature that a player may be capable of achieving on reels 304-312.

In some embodiments, the goal wheel may be spun in response to the placement of a wager. In certain other embodiments, the goal wheel may be spun in response to a random determination made by the game controller 202 whether to provide a player goal to a player. The random determination may be made after the player places a wager. In some embodiments, the determination to provide a player goal may be based on a game outcome.

In some embodiments, a player goal may be persistent over a plurality of spins of reels 304-312. For instance, in the example above, a player goal of collecting a specified number of symbols from reels 304-312 may persist over a series of spins of reels 304-312. Each time reels 304-312 are spun and stopped (as described below), game controller 202 may determine a number of specified symbols displayed from reels 304-312, such that, as gameplay advances, a player may slowly collect the specified number of symbols over the series of spins. Likewise, in some embodiments, a player goal may persist for a specified number of spins of reels 304-312. For example, a player goal may persist for one-hundred spins. In such a case, a player may attempt to achieve an identified player goal for the specified number of spins of reels 304-312. If the player goal is not achieved in the specified number of spins, a new player goal may be selected and identified on goal wheel 302 by game controller 202.

In some embodiments, more than one player goal may be persistent over a plurality of spins of reels 304-312. For example, a first player goal can be determined by spinning the goal wheel 302. The first player goal may persist over a first quantity of spins of reels 304-312. During one of the spins of reels 304-312 when the first player goal is active, a second spin of the goal wheel may be triggered causing a second player goal to become active for a second quantity of spins of reels 304-312, a portion of which may overlap the first quantity of spins.

Similarly, in some embodiments, a player goal may require that a player achieve the goal based upon a single spin of reels 304-312. For example, a player goal may specify a "frenzy" game, which may be triggered during a single spin of reels 304-312 based upon a specified combination of symbols on reels 304-312. More particularly, in some embodiments, a combination of three "scattered" frenzy symbols appearing on reels 304-312 may be sufficient to trigger a frenzy game. If, during a single spin of reels 304-312, the requisite number of frenzy symbols are stopped and displayed from reels 304-312, the player goal may, in this case, be satisfied. In some embodiments, a frenzy game may also be achievable over a plurality of spins of reels 304-312.

In the exemplary embodiment, game controller 202 may also simulate spinning and stopping of reels 304-312 (or spin reels 304-312, in the case that reels 304-312 are mechanical) (step 404). As described herein each reel 304-312 may include a plurality of symbols (such as only a few symbols to several thousand symbols). However, only a subset of symbols from each reel 304-312 may displayed each time reels 304-312 are spun and stopped. In the example at FIG. 3, three symbols are displayed from each reel 304-312 each time reels 304-312 are spun. However, in other embodiments, fewer or greater than three symbols may be displayed from each of reels 304-312 each time reels 304-312 are spun and stopped. In addition, as described herein, each symbol of the subset may be displayed in a symbol position of the matrix defined by the plurality of symbol positions. As used herein, the symbols displayed from each reel 304-312 each time reels 304-312 are spun and stopped may be referred to as a "game outcome."

Game controller 202 may, in addition, spin and stop goal wheel 302, such that a first sector 316 of the plurality of sectors 314 is identified or indicated, such as by pointer 315 (step 406). Specifically, goal wheel 302 may be spun and stopped, such that a sector, such as first sector 316, is identified by pointer 315. As described herein, pointer 315 may identify a selected sector by appearing in conjunction with (e.g., by "pointing to") the selected sector.

Likewise, game controller 202 may spin and stop reels 304-312, such that a plurality of symbols from each reel 304-312 are displayed in the matrix of symbol positions (as described herein) (step 408). In other words, game controller 202 may spin and stop reels 304+312 to display a game outcome. In some embodiments, a variety of symbol combinations (or game outcomes) capable of occurring on reels 304-312 may be correlated to a plurality of player goals included on goal wheel 302. For example, a first player goal, such as collecting three "coin symbols," may be correlated to the occurrence of at least three such "coin" symbols over one or more spins of reels 304-312. Similarly, a second player goal, such as collecting at least three "frenzy" symbols, may be correlated to the occurrence of at least three such "frenzy" symbols over one or more spins of reels 304-312.

In at least some embodiments, if reels 304-312 are spun and stopped, but no player goal is achieved as a result of the spin, game controller 202 may award another spin (e.g., a free spin) of reels 304-312, with or without an additional wager. In such an embodiment, reels 304-312 may be re-spun until a player selects an option to terminate wagering game 300. Similarly, in some embodiments, reels 304-312 may be re-spun a specified number of times (e.g., one-hundred times, assuming a credit balance of the player is sufficient to fund one-hundred corresponding wagers). If the player goal is not achieved in the specified number of spins, game controller 202 may re-spin goal wheel 302 to select a new player goal and/or terminate wagering game 300.

Moreover, in at least one embodiment, a player may be provided an option to re-spin goal wheel 302 at any time during wagering game 300, such as, for example, in the case that the player desires a new player goal with or without an additional wager. Similarly, in at least one embodiment, a "new goal" (or similar) symbol may be displayed from at least one of reels 304-3012. In such an embodiment, occurrence of the "new goal" symbol may cause game controller 202 to re-spin goal wheel 302 for selection of a new player goal.

Likewise, in at least some embodiments, a player goal may be staged, such that a first time the player goal is achieved, the player is provided a first award, and such that, if the player goal is identified on goal wheel 302 a second time, the player is provided a second award. For example, a player goal to collect three "coin" symbols may correspond to a "MINI" game award until a player achieves the goal. If game controller 202 selects and identifies this same goal later during gameplay (e.g., during a subsequent spin of goal wheel 302), the goal may correspond to another, superior or larger, game award, such as a "MINOR," "MAJOR," or "GRAND" game award. A player goal may thus recur on goal wheel 302 after it has been achieved at least once, but in association with a superior or otherwise larger game award.

Accordingly, game controller 202 may, after reels 304-312 are spun and stopped, evaluate the symbols, or game outcome, displayed from each of reels 304-312 (step 410). As described, herein, game controller 202 may, in addition, determine whether the symbols, or game outcome, displayed from each of reels 304-312 satisfy a player goal indicated on goal wheel 302 (step 412). Specifically, game controller 202 may evaluate the symbols displayed from each reel 304-312 to determine whether the displayed symbols satisfy or correlate to a goal displayed on an identified sector **314*a*-314*i* of goal wheel 302**.

If the player goal indicated on goal wheel 302 is not satisfied, game controller 202 may, in at least some embodiments, re-spin reels 304-312, re-spin goal wheel 302, and/or terminate wagering game 300. If the player goal indicated on goal wheel 302 is satisfied, game controller 202 may take an action corresponding to the player goal (step 414). For example, game controller 202 may provide a game award corresponding to the player goal. Similarly, game controller 202 may initiate a secondary or bonus game when a player achieves a player goal specified on goal wheel 302.

Figure 5:
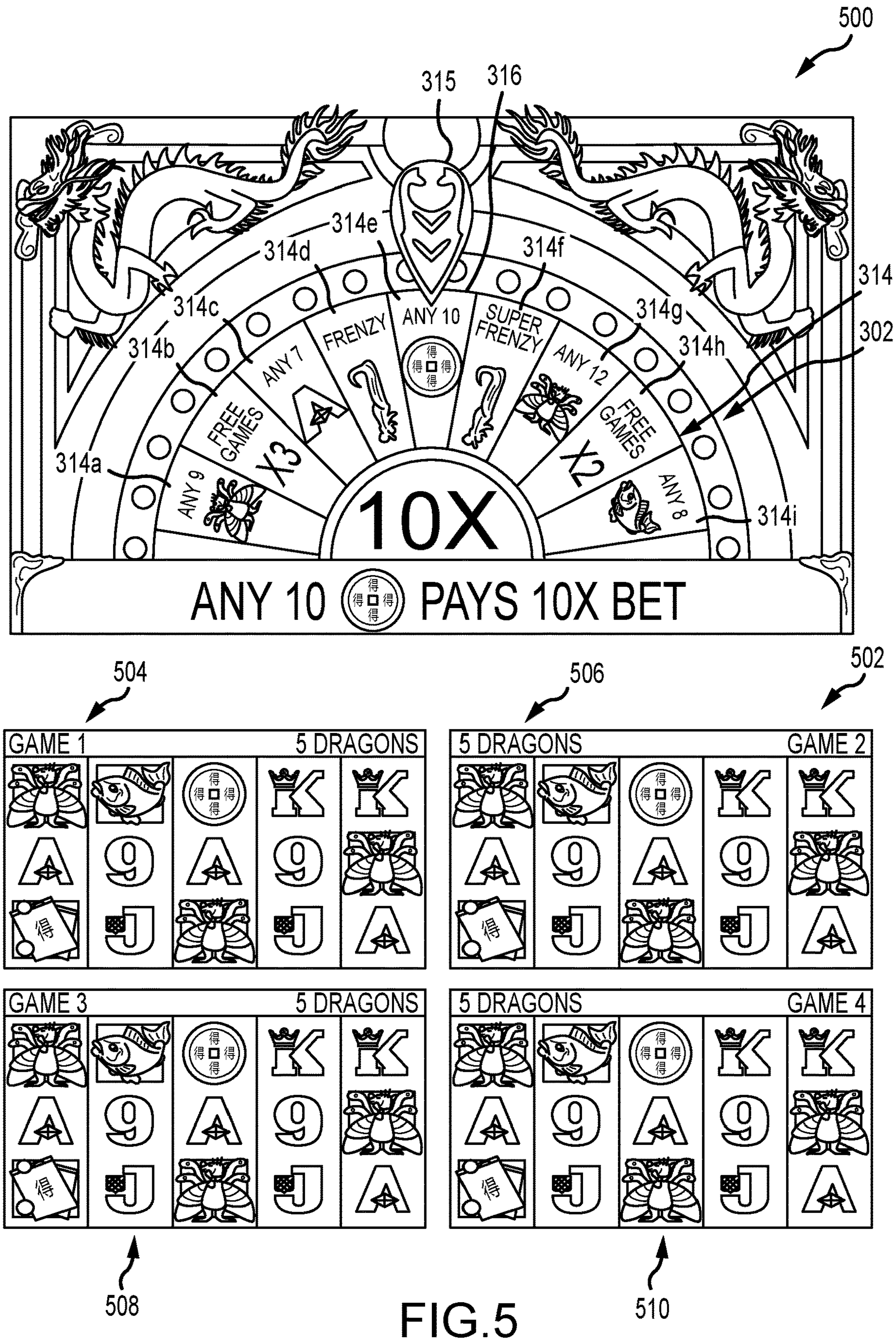
FIG. 5 is an illustration of a visual display of an exemplary wagering game that includes a goal wheel and a plurality of sets of reels.

FIG. 5 is an illustration of a visual display of an exemplary wagering game 500 that includes goal wheel 302 and a plurality of sets of reels 502. Specifically, wagering game 500 includes goal wheel 302, a first set of reels 504, a second set of reels 506, a third set of reels 508, and a fourth set of reels 510. Although four sets of reels 504-510 are shown and described herein, it will be appreciated that any number of sets of reels may be included in wagering game 500 (e.g., two sets of reels, three sets of reels, etc.)

During play of wagering game 500, each set of reels 504-510 may be simultaneously or sequentially spun and stopped, such that each of the set of reels 504-510 are stopped and display symbols that form the game outcomes for each of the four sets of reels. As described herein, game controller 202 may evaluate the symbols displayed from each set of reels to determine whether a player goal indicated on goal wheel 302 is satisfied. One advantage (from a player perspective) of wagering game 500 may be that a player has a better (perceived and/or actual) chance of achieving a specified player goal during a single spin of each set of reels 504-510. For example, in the case of four sets of reels 504-510, a player experience may be such that any set of reels 504-510 may individually and/or in combination with any other set or sets of reels 504-510 satisfy a player goal. In the case of a player goal to collect three “coin” symbols, a player may collect a first coin from first set of reels 504, a second coin from second set of reels 506, and a third coin from third set of reels 508.

As described herein, multiple goal wheels may also be displayed in conjunction with multiple sets of reels 504-510. In such a case, a player may achieve multiple player goals based upon a single spin of each set of reels 504-510 and/or based upon a series of spins of each set of reels 504-510. For example, where a first goal wheel indicates a player goal to collect three “coin” symbols, and a second goal wheel indicates a player goal to collect three “frenzy” symbols, each player goal may be satisfied simultaneously, from a single spin of each set of reels 504-510 and/or in a staggered fashion, such that one player goal is satisfied first, and the other player goal is satisfied next or later. Further, as described herein, each player goal may be satisfied, in at least some embodiments, over multiple spins of each set of reels 504-510.

Figure 6:
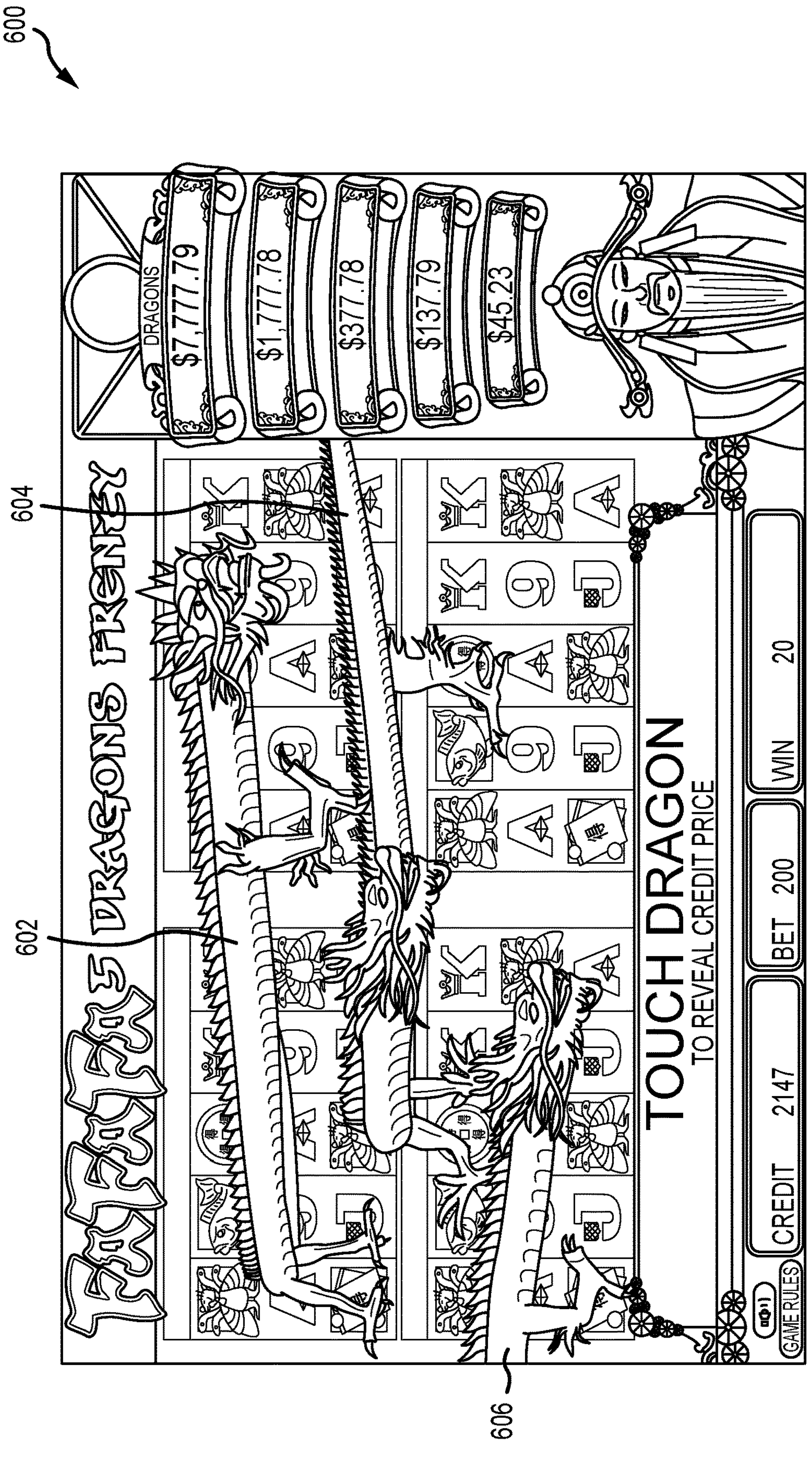
FIG. 6 is an illustration of a visual display of an exemplary mini-game that may be triggered during the wagering game described with respect to FIGS. 3-5.

FIG. 6 is an illustration of a visual display of an exemplary mini-game 600 that may be triggered during a wagering game, as described herein, such as either of wagering games 300 and/or 500. Specifically, FIG. 6 show a “frenzy” game, as described herein, which may be triggered from either of wagering games 300 and/or 500, such as, for example, in response to collection by a player of at least a specified number of “frenzy” symbols from one or more reels 304-312 and/or one or more sets of reels 504-510. Although a frenzy game is depicted, it will be appreciated that any suitable secondary or bonus game may be triggered from wagering game 300 and/or wagering game 500.

Accordingly, in at least one embodiment, game controller 202 may display, during mini-game 600, a plurality of moving objects, such as, for example, a first dragon 602, a second dragon 604, a third dragon 606, etc. Each dragon 602-606 may appear to fly across over reels 304-312 and/or one or more sets of reels 504-510. Further, each dragon 602-606 may be selectable by a player. For instance, a player may touch or tap any dragon 602-606 (e.g., using a touch-screen display) to select the dragon 602-606.

In some embodiments, game controller 202 may determine an amount of time taken by a player to tap one or more dragons 602-606, and, based upon the amount of time taken, one or more bonus awards may be provided. Specifically, a bonus award may begin at an initial value and decrease based upon the amount of time taken. Greater durations of time may correspond to smaller bonus awards. Further, a player may be provided a larger bonus award, or simply a greater number of bonus awards, based upon a number of dragons 602-606 selected. Specifically, greater numbers of dragons 602-606 selected or tapped on by the player may correspond to a larger bonus award and/or a larger number of bonus awards. For instance, in at least one embodiment, if a player successfully selects (e.g., by tapping) all three dragons 602-606 before the dragons 602-606 are removed or “fly off” of wagering game 300 and/or wagering game 500, the player may be provided three individual bonus awards.

Thus, a player may be incentivized to select as many dragons 602-606 as possible in a least amount of time possible. Mini-game 600 may thus create a player “frenzy,” in that the player is attempting to select as many dragons 602-606 as quickly as possible. On termination of mini-game 600, game controller 202 may return the player to wagering game 300 and/or wagering game 500. Similarly, in some embodiments, on termination of mini-game 600, game controller 202 may terminate wagering game 300 and/or wagering game 500.

In some embodiments, players may compete, such as, for example, as part of a tournament game, to achieve a player goal. For example, a plurality of EGMs 104A-104X may be networked (e.g., communicatively coupled) through a central server system, such as through player tracking system server 110 and/or through any other suitable game server or gaming server system. During gameplay, a goal wheel, such as goal wheel 302, may be displayed for each player. Likewise, each EGM 104A-104X may display a plurality of reels, such as reels 304-312. However, as described below, in a tournament embodiment, a player goal may not be selected by each EGM 104A-104X individually, but by the gaming server system. Further, once selected by the gaming server system, the player goal may be provided or transmitted to each EGM 104A-104X, and each EGM 104A-104X may spin and stop a respective goal wheel 302 to identify the same player goal.

Similarly, although each EGM 104A-104X may display an individual goal wheel 302, the goal wheel 302 may be the same for all players. Specifically, one result of selection of the player goal selected by the gaming server system may be that each EGM 104A-104X displays the same goal wheel, or, at least, stops, when spun, on a sector indicating the same player goal. In response to placement of a credit wager by each player, each game controller 202 of each EGM 104A-104X participating in the tournament (and/or the gaming server system) may spin and stop a respective goal wheel 302, such that a sector 314*a*-314*i* of goal wheel 302 is selected and/or identified. In the exemplary embodiment, the same sector 314*a*-314*i* including the same goal (or at least the same goal) may be selected and identified for each player. Thus, each player may participate in the tournament game to achieve the same player goal. In some embodiments, a single enlarged goal wheel may be displayed, such as, for example, where the enlarged goal wheel is within view of each player. In one embodiment, an enlarged goal wheel may be provided over a bank of networked EGMs 104A-104X.

Moreover, as described above, each player's EGM 104A-104X may display one or more sets of reels. For example, each player's EGM 104A-104X may display reels 304-312 and/or sets of reels 504-510. Irrespective of the specific embodiment, each EGM 104A-104X may spin and stop the reels displayed for each player to determine whether any player has achieved a game outcome corresponding to the specified player goal. In at least one embodiment, the first player to achieve the player goal may be provided a tournament game award, such as a linked progressive jackpot award and/or any other suitable award. Likewise, as described herein, the first player to achieve the specified player goal may trigger a frenzy game, which may be provided to the player and/or distributed as a game enhancement to each player participating in the tournament.

To determine which player first achieves a specified player goal, in at least some embodiments, each EGM 104A-104X may provide or transmit a game outcome associated with a spin or a respective plurality of reels displayed by the EGM 104A-104X (as described herein) to the gaming server system. Thus, the gaming server system may receive a game outcome from each of the plurality of EGMs 104A-104X participating in the tournament. In response, the gaming server system may compare each game outcome to the selected player goal to determine whether any EGM 104A-104X has achieved the player goal. Further, one or more EGMs 104A-104X have achieved the selected player goal, the gaming server system may determine which EGM 104A-104X first achieved the selected player goal, and in response, provided a game award to the EGM 104A-104X that first achieved the player goal.

To determine which EGM 104A-104X first achieves a selected player goal, the gaming server system may, in various embodiments, simply determine whether any game outcome received from an EGM 104A-104X satisfies the player goal, and if so, the gaming server system may determine that the EGM 104A-104X has first achieved the player goal. However, in other embodiments, each received game outcome may be associated with a timestamp, and the gaming server system may compare timestamps associated with two or more game outcomes satisfying the player goal to determine which EGM 104A-104X first achieved the player goal. In yet another embodiment, the gaming server system may compare game outcomes to a selected player goal in real-time as each game outcome is received from an EGM 104A-104X, and the game outcome that first satisfies the player goal (e.g., in order of receipt) may be the winning game outcome. Further still, in at least some embodiments, if two or more EGMs 104A-104X satisfy a selected player goal within a threshold period of time (e.g., several seconds or even several minutes), each EGM 104A-104X may be provided a game award and/or a game award, such as a progressive jackpot, may be divided between the EGMs 104A-104X.

Thus, a wagering game is provided. The wagering game may include one or more goal wheels and one or more sets of reels. In the exemplary embodiment, a single goal wheel is provided in conjunction with a single set of reels. The goal wheel may be partitioned into a plurality of sectors, each of which may specify a player goal to be achieved on the reels. During gameplay, the goal wheel may be spun and stopped, such that a sector of the wheel is selected and identified. Further, the reels may be spun and stopped, and a plurality of symbols from each of the reels may be displayed. The symbols from each reel may be evaluated to determine whether the player goal associated with the identified sector of the goal wheel is satisfied. If the player goal is satisfied, the player may receive a game award, a bonus game, such as a “frenzy” game, may be initiated, and/or any other suitable action may be taken.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
at least one processor; and
at least one memory with instructions stored thereon that, in response to execution by the at least one processor, cause the at least one processor to:
configure a wheel comprising a plurality of sectors, wherein a first sector of the plurality of sectors is associated with a first goal of a plurality of goals, and a second sector of the plurality of sectors is associated with a second goal of the plurality of goals;
select the first goal of the plurality of goals, based upon a selection of the first sector of the plurality of sectors determine a first game outcome based upon a first plurality of symbols in a symbol area;
determine whether the first goal is satisfied based upon the first game outcome;
determine a second game outcome based upon a second plurality of symbols in the symbol area;
determine whether the first goal is satisfied based upon the second game outcome; and
based upon the first goal being satisfied, determine a game award associated with the first goal.

2. The electronic gaming device of claim 1, wherein the instructions further cause the at least one processor to, in response to determining that the first goal is satisfied, select the second sector of the plurality of sectors, wherein the second sector is associated with the second goal of the plurality of goals.

3. The electronic gaming device of claim 1, wherein the instructions further cause the at least one processor to:
determine a third game outcome based upon a third plurality of symbols in another symbol area;
determine whether the first goal is satisfied based upon at least the first game outcome, the second game outcome, and the third game outcome; and
based upon the first goal being satisfied, determine the game award associated with the first goal.

4. The electronic gaming device of claim 1, wherein the instructions further cause the at least one processor to:
select a second goal of the plurality of goals;
select a second sector of the plurality of sectors, wherein the second sector is associated with the second goal;
determine a third game outcome based upon a third plurality of symbols in the symbol area;
determine whether the second goal is satisfied based at least upon the third game outcome; and
based upon the second goal being satisfied, determine a game award associated with the second goal.

5. The electronic gaming device of claim 1, wherein the instructions further cause the at least one processor to determine to select a goal of the plurality of goals based upon a random number generator (RNG) output.

6. The electronic gaming device of claim 1, wherein the electronic gaming device comprises a server computer device, and wherein the instructions further cause the at least one processor to transmit content to a second gaming device, wherein the content causes at least the wheel, the first plurality of symbols, and the second plurality of symbols to be displayed on the second gaming device, and wherein the second gaming device comprises at least one of a smart phone, a tablet, a laptop, or a game console.

7. The electronic gaming device of claim 1, wherein the instructions further cause the at least one processor to:
cause display of a plurality of objects;
determine an amount of time taken to receive an input selecting at least one object of the plurality of objects;
determine an amount of the plurality of objects selected; and
determine a second game output based upon at least one of the amount of time or the amount of objects selected.

8. A non-transitory computer-readable storage medium with instructions stored thereon that, in response to execution by at least one processor, cause the at least one processor to:
arrange a wheel comprising a plurality of areas, wherein a first area of the plurality of areas is associated with a first goal of a plurality of goals, and a second area of the plurality of areas is associated with a second goal of the plurality of goals;
select the first goal of the plurality of goals, based upon a selection of the first area of the plurality of areas;
determine a first game outcome based upon a first plurality of symbols in a symbol area;
determine whether the first goal is satisfied based upon the first game outcome;
determine a second game outcome based upon a second plurality of symbols in the symbol area;
determine whether the first goal is satisfied based upon the second game outcome; and
based upon the first goal being satisfied, determine a game output associated with the first goal.

9. The non-transitory computer-readable storage medium of claim 8, wherein the instructions further cause the at least one processor to, in response to determining that the first goal is satisfied, select the second area of the plurality of areas, wherein the second area is associated with the second goal of the plurality of goals.

10. The non-transitory computer-readable storage medium of claim 8, wherein the instructions further cause the at least one processor to:
determine a third game outcome based upon a third plurality of symbols in another symbol area;
determine whether the first goal is satisfied based upon at least the first game outcome, the second game outcome, and the third game outcome; and
based upon the first goal being satisfied, determine the game output associated with the first goal.

11. The non-transitory computer-readable storage medium of claim 8, wherein the instructions further cause the at least one processor to:
identify a second goal of the plurality of goals;
identify a second area of the plurality of areas, wherein the second area is associated with the second goal;
determine a third game outcome based upon a third plurality of symbols in the symbol area;
determine whether the second goal is satisfied based at least upon the third game outcome; and
based upon the second goal being satisfied, determine a game output associated with the second goal.

12. The non-transitory computer-readable storage medium of claim 8, wherein the instructions further cause the at least one processor to determine to identify a goal of the plurality of goals based upon a random number generator (RNG) output.

13. The non-transitory computer-readable storage medium of claim 8, wherein the at least one processor to is included in a server computer device, and wherein the instructions further cause the at least one processor to transmit content to a second gaming device, wherein the content causes at least the wheel, the first plurality of symbols, and the second plurality of symbols to be displayed on the second gaming device.

14. The non-transitory computer-readable storage medium of claim 13, wherein the second gaming device comprises at least one of a smart phone, a tablet, a laptop, or a game console.

15. The non-transitory computer-readable storage medium of claim 8, wherein the instructions further cause the at least one processor to:
cause display of a plurality of objects;
determine an amount of time taken to receive an input selecting at least one object of the plurality of objects;
determine an amount of the plurality of objects selected; and
determine a second game output based upon at least one of the amount of time or the amount of objects selected.

16. A method of electronic gaming implemented by at least one processor in communication with at least one memory, the method comprising:
displaying a wheel comprising a plurality of sectors, wherein a first sector of the plurality of sectors is associated with a first goal of a plurality of goals, and a second sector of the plurality of sectors is associated with a second goal of the plurality of goals;
selecting the first goal of the plurality of goals based upon a selection of the first sector of the plurality of sectors;
receiving a first game outcome;
determining whether the first goal is satisfied based upon the first game outcome;
receiving a second game outcome;
determining whether the first goal is satisfied based upon the first game outcome; and
based upon the first goal being satisfied, causing a game output associated with the first goal to be displayed.

17. The method of claim 16, further comprising, in response to determining that the first goal is satisfied, selecting a second sector of the plurality of sectors, wherein the second sector is associated with a second goal of the plurality of goals.

18. The method of claim 16, further comprising:
receiving a third game outcome;
determining whether the first goal is satisfied based upon at least the first game outcome, the second game outcome, and the third game outcome; and
based upon the first goal being satisfied, causing the game output to be displayed.

19. The method of claim 16, further comprising:
causing display of a plurality of objects;
determining an amount of time taken to receive an input selecting at least one object of the plurality of objects;
determining an amount of the plurality of objects selected; and
determining a second game output based upon at least one of the amount of time or the amount of objects selected.

20. The method of claim 16, further comprising determining to select a goal of the plurality of goals based upon a random number generator (RNG) output.

* * * * *